United States Patent
Claseman

(10) Patent No.: US 7,483,426 B2
(45) Date of Patent: Jan. 27, 2009

(54) LOOK-UP TABLE EXPANSION METHOD

(75) Inventor: George R. Claseman, Campbell, CA (US)

(73) Assignee: Micrel, Inc., San Jose, CA (US)

( * ) Notice: Subject to any disclaimer, the term of this patent is extended or adjusted under 35 U.S.C. 154(b) by 796 days.

(21) Appl. No.: 10/845,675

(22) Filed: May 13, 2004

(65) Prior Publication Data

US 2005/0283711 A1 Dec. 22, 2005

(51) Int. Cl.
*H04L 12/28* (2006.01)
*H04L 12/56* (2006.01)
*H03M 13/00* (2006.01)

(52) U.S. Cl. ...................... 370/392; 714/759
(58) Field of Classification Search ............... 714/759
See application file for complete search history.

(56) References Cited

U.S. PATENT DOCUMENTS

| | | | | |
|---|---|---|---|---|
| 5,339,398 | A * | 8/1994 | Shah et al. .................. 711/216 |
| 5,960,434 | A * | 9/1999 | Schimmel .................... 707/100 |
| 6,014,730 | A * | 1/2000 | Ohtsu ......................... 711/170 |
| 6,067,547 | A * | 5/2000 | Douceur ..................... 707/100 |
| 6,212,183 | B1 | 4/2001 | Wilford |
| 6,233,337 | B1 | 5/2001 | Etzel et al. |
| 6,400,180 | B2 | 6/2002 | Wittig et al. |
| 6,580,712 | B1 * | 6/2003 | Jennings et al. ............. 370/392 |
| 6,804,230 | B1 * | 10/2004 | Jennings et al. ............. 370/388 |
| 2001/0042130 | A1 | 11/2001 | Brown |
| 2002/0138648 | A1 | 9/2002 | Liu |
| 2003/0084057 | A1 * | 5/2003 | Balogh ....................... 707/100 |
| 2004/0001492 | A1 * | 1/2004 | Johnson .................. 370/395.32 |
| 2005/0050294 | A1 * | 3/2005 | Horn et al. .................. 711/203 |

* cited by examiner

*Primary Examiner*—Edan Orgad
*Assistant Examiner*—Blanche Wong
(74) *Attorney, Agent, or Firm*—Patent Law Group LLP; Carmen C. Cook

(57) ABSTRACT

A look-up table includes a first table formed using a first portion of the table entries where each table entry is associated with a look-up address and includes one or more key-data value pairs and an expansion pointer field, and a second table formed using a second portion of the table entries where each table entry is associated with an expansion address and includes one or more key-data value pairs. An expansion pointer field in a first table entry in the first table identifies a first expansion address associated with a second table entry in the second table as a first expansion pointer for linking the second table entry to the first table entry, thereby providing expansion of the first table entry. Each table entry in the second table can also include an expansion pointer field to provide table entry expansion through linking of multiple table entries in the second table.

7 Claims, 3 Drawing Sheets

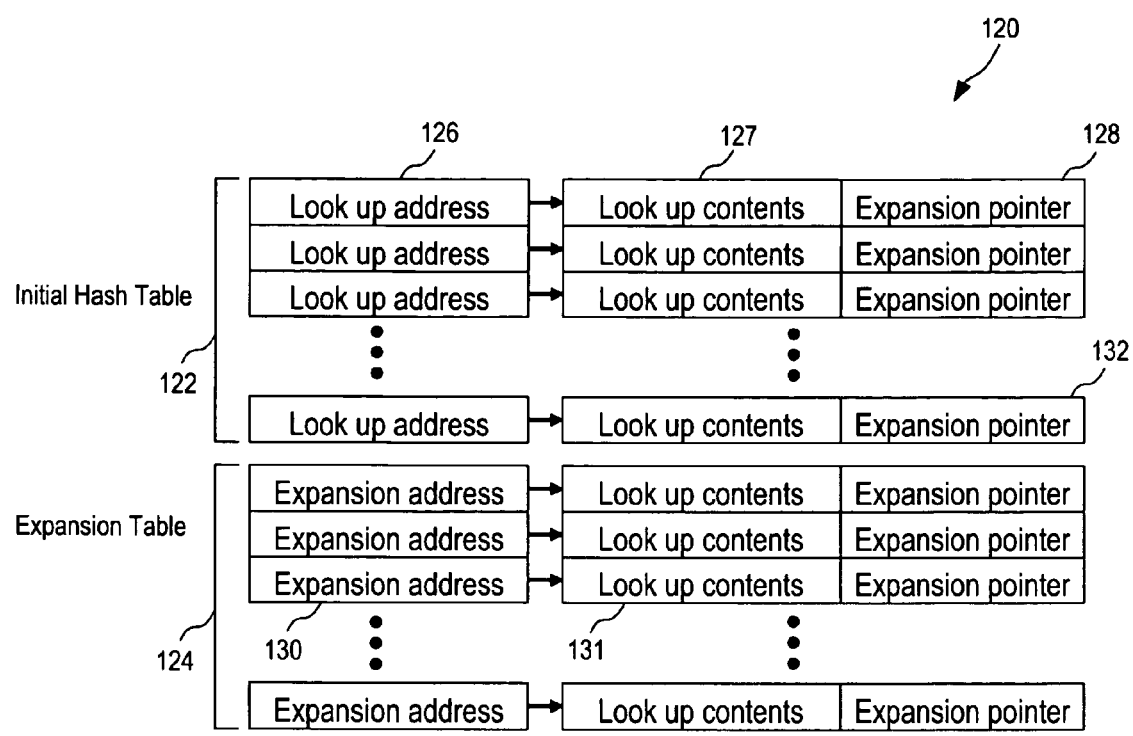
_Figure 2_

LOOK-UP TABLE EXPANSION METHOD

FIELD OF THE INVENTION

The invention relates to a method in a look-up table or a hash table and, in particular, to a method for providing entry expansion to a look-up table or a hash table.

DESCRIPTION OF THE RELATED ART

In many electronic devices, the value of an input field is examined and processed to determine the specific action to take. Information associating the value of the input field to the desired action is typically stored in the electronic device. One conventional method uses a Content Addressable Memory (CAM) which directly associates information regarding the desired action based on the value of the input field being looked up. Another method uses a hash engine with a look-up table where entries associating the value of the input field to the desired action to be taken are stored in the look-up table.

When hashing is employed, a hash function is used to take a variable-sized input field, sometimes referred to as "a key," and reduce the input field to a smaller fixed-size output value, called a "hash value." The hash value is used in turn to look up information stored in the look-up table, sometimes referred to as a "hash table." The information stored in the look-up table can be viewed as being divided into hash buckets or hash entries, with each hash value identifying one hash bucket. Each hash bucket includes a list of key values and the associated data values indicating the desired action to be taken. Since different values of an input key may hash to the same bucket, each bucket may have different number of key-data value pairs. In operation, an input key is hashed to obtain the hash value in which the hash value is used to find the corresponding hash bucket in the look-up table. Then, the hash bucket is searched for the input key to retrieve the corresponding data value.

Most implementations of a hash table use a fixed memory size per hash bucket which leads to a finite and fixed number of input field-data value pairs per hash value. This fixed size bucket limitation is undesirable when a hash function generates an imbalance in the number of key-data value pairs between different hash values.

SUMMARY OF THE INVENTION

According to one embodiment of the present invention, a look-up table includes a first table formed using a first portion of the table entries in the look-up table where each table entry in the first table is associated with a look-up address and includes one or more key-data value pairs and an expansion pointer field, and a second table formed using a second portion of the table entries in the look-up table where each table entry in the second table is associated with an expansion address and includes one or more key-data value pairs. A first expansion pointer field in a first table entry in the first table identifies a first expansion address associated with a second table entry in the second table as an expansion pointer for linking the second table entry to the first table entry, thereby providing expansion of the first table entry.

In one embodiment, the look-up table receives an input key and provides a data value corresponding to the input key through a search in a table entry in the first table and any corresponding table entry in the second table linked by the expansion pointer of the table entry in the first table.

According to an alternate embodiment, each table entry in the second table also includes an expansion pointer field to provide further expansion of the first table entry through linking of multiple table entries in the second table. In one embodiment, the second table contains random access entries and the table entries in the second table are random access entries. In this manner, maximum flexibility in the table expansion method is achieved.

According to another aspect of the present invention, a method in a look-up table for obtaining a data value associated with a key includes providing a first table in the look-up table where each table entry in the first table is associated with a look-up address and includes one or more key-data value pairs and an expansion pointer field and providing a second table in the look-up table where each table entry in the second table is associated with an expansion address and includes one or more key-data value pairs. The method further includes receiving an input key, applying a hash function to the input key, generating a hash value for use as a look-up address, indexing the first table of the look-up table using the look-up address, identifying a first table entry in the first table associated with the look-up address, determining if the input key matches any key in the one or more key-data value pairs in the first entry. If a match is found, the data value associated with the input key is retrieved. If a match is not found, a first expansion pointer in the expansion pointer field associated with the first table entry is retrieved. The method continues and includes indexing the second table of the look-up table using the first expansion pointer, identifying a second table entry in the second table associated with the first expansion pointer, and determining if the input key matches any key in the one or more key-data pairs in the second table entry.

The present invention is better understood upon consideration of the detailed description below and the accompanying drawings.

BRIEF DESCRIPTION OF THE DRAWINGS

FIG. 2 illustrates a look-up table including expansion table entries configured in accordance with the look-up table expansion method according to one embodiment of the present invention.

DETAILED DESCRIPTION OF THE PREFERRED EMBODIMENTS

In accordance with the principles of the present invention, a look-up table expansion method uses a hash value to establish an initial index to a table entry in a look up table, and then uses an expansion pointer to index additional table entries for any given hash value. In this manner, the number of key-data value pairs that can be associated with each hash value in the look-up table is no longer fixed but a given hash value can be provided with additional table entries for storing additional key-data value pairs when needed. Furthermore, the table entries in the expansion part of the look-up table can also contain expansion pointers so that a given hash value can be associated with multiple expansion table entries. Thus, the look-up table expansion method of the present invention realizes asymmetric table expansion to allow certain hash values to have a large number of expansion entries while other hash values can have little or no expansion entries. The look-up table expansion method can be used to support hash algorithms that have significant imbalance of key-data value pairs for the resulting hash values.

Figure 1:
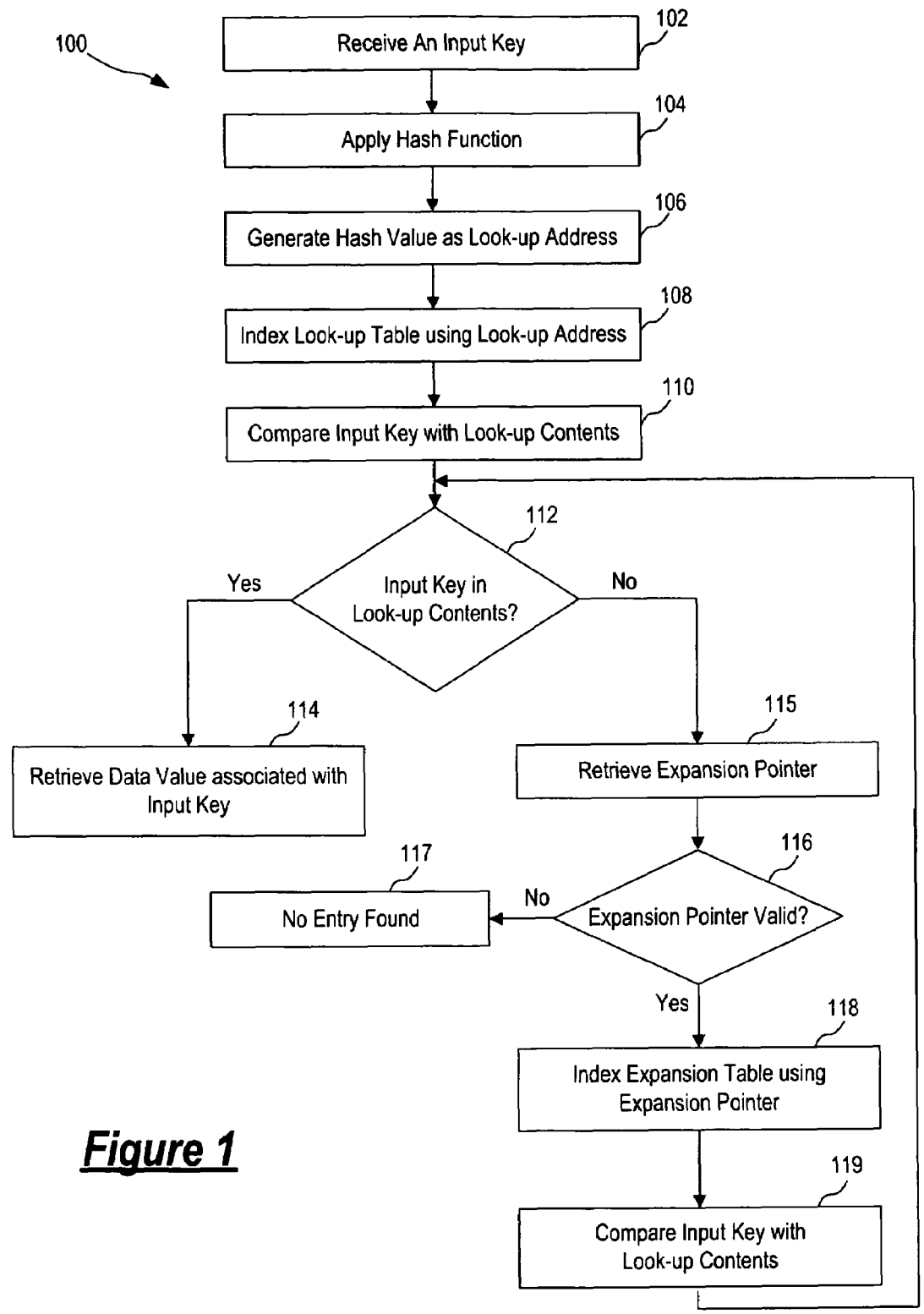
FIG. 1 is a flowchart illustrating the look-up table expansion method according to one embodiment of the present invention.

FIG. 1 is a flowchart illustrating the look-up table expansion method according to one embodiment of the present invention. FIG. 2 illustrates a look-up table including expansion table entries configured in accordance with the look-up table expansion method according to one embodiment of the present invention. The configuration of the look-up table will be described first followed by the description of the table look-up method using the look-up table of FIG. 2.

Referring to FIG. 2, a look-up table 120 is configured for use as a hash table and is associated with a hash function generating hash values to be used as look-up addresses to the look-up table. Look-up table 120 includes a first portion of table entries configured as an initial hash table 122 and a second portion of table entries configured as an expansion table 124. Initial hash table 122 includes multiple table entries (or multiple hash buckets) where each entry is associated with a look-up address 126. The look-up addresses correspond to hash values which are generated by a hash function with which the look-up table is to be used. Each entry in initial hash table 122 also includes look-up contents field 127 associated with the look-up address. The look-up contents of each entry include one or more key-data value pairs.

In accordance with the present invention, each table entry of initial hash table 122 also includes an expansion pointer field 128. The expansion pointer field is used to expand the memory allocation for a given look-up address so that more key-data value pairs can be stored for the look-up address. Specifically, the expansion pointer field of a table entry may include an expansion pointer pointing to an expansion table entry in expansion table 124 of look-up table 120. By storing the appropriate expansion address in expansion pointer field 128, expansion of the size of the table entry associated with each hash value can be realized. When no table expansion is desired, the expansion pointer field can store the look-up address for that table entry to indicate that no table entry expansion is associated with this look-up address.

In the present embodiment, expansion table 124 of look-up table 120 is configured as a random access table. Expansion table 124 is used to provide expansion of any table entry in initial hash table 122. Each table entry in expansion table 124, referred to as an expansion table entry, is a random access entry and includes an expansion address 130 and associated look-up contents 131. Each table entry in expansion table 124 also includes an expansion pointer field 132. By storing the appropriate expansion address as the expansion pointer in the expansion pointer field, a first expansion entry can be linked to a second expansion entry in expansion table 124. Thus, multiple entries in the expansion table can be linked to provide the desired amount of table expansion for a given look-up address. In one embodiment, termination of the table expansion is implemented by having the last expansion pointer in the series of expansion table entries indicate the initial hash value or the initial look-up address. In this manner, a circular link list is created linking a table entry in initial hash table 122 to one or more expansion table entries in expansion table 124. The circular link list can be used for table maintenance if a fault occurs.

In the present configuration, the expansion table entries in expansion table 124 include an expansion pointer field to provide further expansion of a table entry in the initial hash table. The provision of an expansion pointer field in the expansion table entries is optional and can be omitted in applications where extended table expansion is not required.

Furthermore, when an expansion entry in expansion table 124 is not used, the expansion pointer field of that entry can point to itself. That is, the expansion pointer field contains its own expansion address as the expansion pointer value to indicate that the expansion entry is not used.

By using expansion pointers in the initial hash table and in the expansion table, each hash value can be provided with as much storage area as needed for storing look-up contents. Thus, look-up table 120 can support hashing algorithms that produce imbalance of key-data value pairs for the resulting hash values. In look-up table 120, the size of the initial hash table is a function of the hash values while the size of the expansion table is only limited by the size of the expansion pointer.

The table look-up method using the look-up table with expansion table entries of FIG. 2 will now be described with reference to the flowchart of FIG. 1. Referring to FIG. 1, table look-up method 100 (hereinafter "method 100") starts by taking an input key (step 102) and applying the input key to a hash function (step 104). A hash value is generated by the hash function (step 106) which hash value is the look-up address for indexing look-up table 120. For example, the input key can be a data field of 48 bits. The hash function reduces the input key to a hash value of 8 bits and the 8-bit hash value is the look-up address for look-up table 120.

The hash value is used as the look-up address to index look-up table 120 (step 108). Using the look-up address, a table entry in initial hash table 122 is identified. Then, the input key is compared against the key values in the look-up contents of the identified table entry (step 110). For example, the 8-bit hash value is used to index an entry in look-up table 120 and then the 48-bit input key is compared against the key values in the look-up contents. If a match is found (step 112), the data value associated with the input key is retrieved (step 114).

If a match is not found (step 112), then the expansion pointer field associated with the identified table entry is retrieved (step 115). When the expansion pointer field in the initial hash table 122 points to itself, that is, the expansion pointer field contains the look-up address, then there is no expansion associated with the identified table entry and method 100 terminates.

In the present embodiment, if an expansion pointer is stored in the expansion pointer field, the validity of the expansion pointer is checked (step 116). A fault condition can exist, for example, when an expansion pointer in the initial hash table points to an expansion table entry that is not used. For instance, an expansion table entry can have its own expansion address in the expansion pointer field to indicate that the expansion table entry is not used. An expansion pointer indicating an unused expansion table entry is invalid. In method 100, if the expansion pointer field contains an invalid expansion pointer, method 100 terminates with no expansion entry found (step 117).

If the expansion pointer is valid, the expansion pointer is used to index expansion table 124 to identify an expansion table entry in the expansion table storing key-data pairs for the initial hash value associated with the input key (step 118). Again, the input key is compared against the key values in the look-up contents of the expansion table entry (step 119). If a match is found (step 112), then the data value associated with the input key is retrieved from the expansion table entry (step 114). If a match is not found, method 100 can proceed to another expansion entry if the first expansion entry indicates a further expansion pointer in expansion pointer field 132. Thus, method 100 proceeds to step 115 and repeats steps 115 to 119 to index another expansion table entry and compare the look-up contents with the input key value.

Method 100 continues until all the expansion table entries associated with the initial hash value has been exhausted. In the present embodiment, the last expansion table entry is indicated by storing the initial hash value or the initial look-up address in the last expansion pointer field. A circular link list is thus formed. Alternately, a special code can be used to indicate the end of the expansion entries.

The look-up table expansion method of the present invention has particular application in network devices for handling network addresses. For example, a layer-two device in a data network typically includes a look-up table for storing MAC addresses of network nodes connected thereto and the identification of the associated forwarding ports. A hash table is typically used as the network address is usually a large data field with variable data bits. The network address needs to be reduced to a smaller fixed-sized value so that the forwarding information can be efficiently retrieved from the look-up table.

Figure 3:
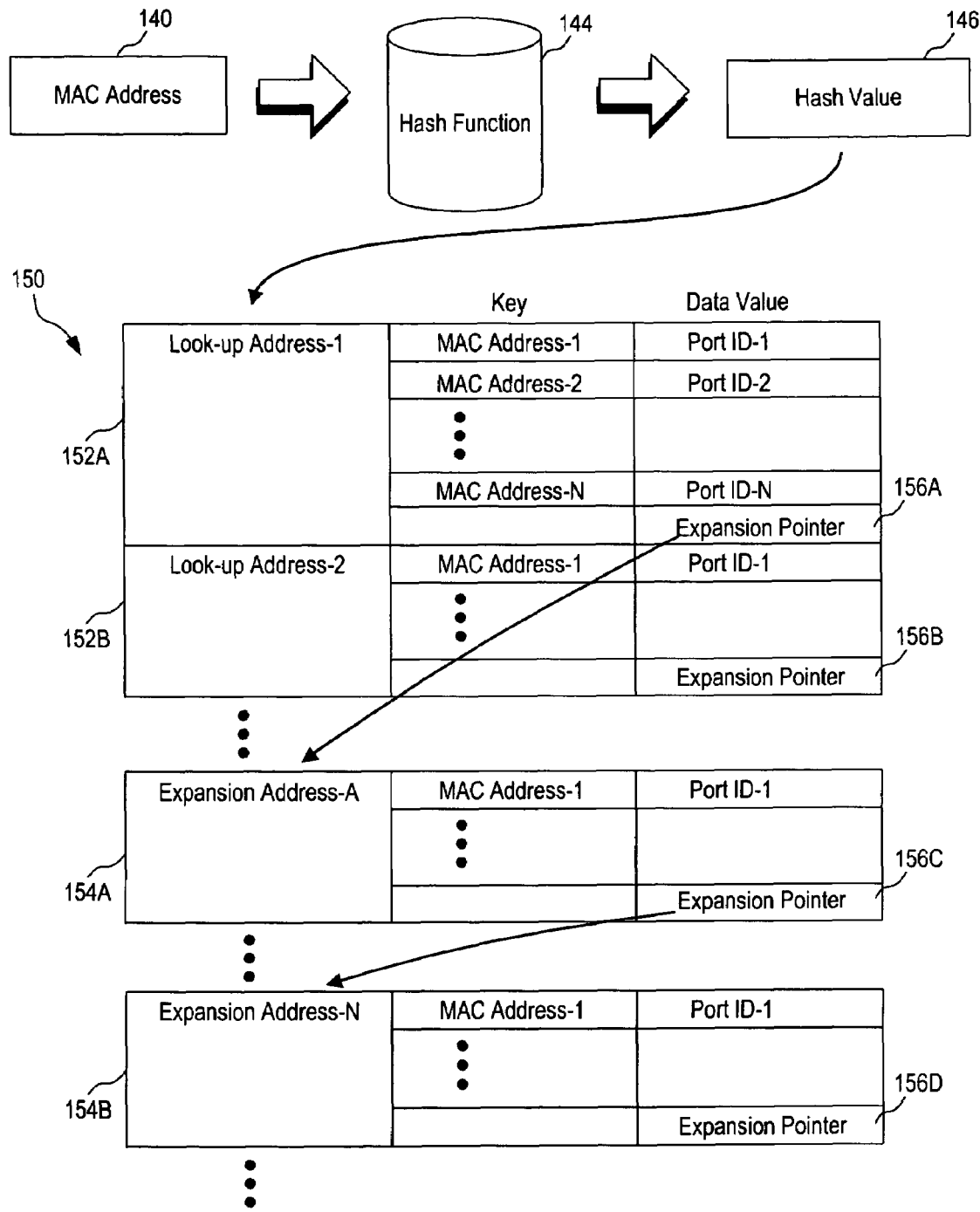
FIG. 3 is a schematic diagram illustrating the application of the look-up table expansion method of the present invention for storing network addresses and associated forwarding information.

FIG. 3 is a schematic diagram illustrating the application of the look-up table expansion method of the present invention for storing network addresses and associated forwarding information. Referring to FIG. 3, a network address, such as a MAC address 140, is provided to a hash function 144. The MAC address may be of variable bit length. The hash function generates a fixed size hash value 146. The hash value is then used to index look-up table 150 to retrieve the forwarding port information.

In the present illustration, look-up table 150 includes an initial hash table including at least table entries 152A and 152B. In each of entries 152A and 152B, the look-up contents include a list of MAC addresses and the corresponding port identification (Port ID). Each entry in the initial hash table also includes an expansion pointer field, such as expansion pointer fields 156A and 156B.

Look-up table 150 also includes an expansion table including at least expansion table entries 154A and 154B. In each of expansion table entries 154A and 154B, the look-up contents include a list of MAC addresses and the corresponding port identification (Port ID). Each entry in the expansion table also includes an expansion pointer field, such as expansion pointer fields 156C and 156D. By using expansion pointers to link the table entries in the initial hash table and the expansion table together, expansion of the table entries in the initial hash table is realized. At the last expansion entry, the expansion pointer has a value the same as the initial look-up address. When an expansion entry is not used, the expansion pointer field of that entry includes its own expansion address to indicate the absence of an expansion pointer.

Because the expansion table is a random access table, expansion table entries 154A and 154B are random access entries and expansion addresses associated with the expansion table entries are not necessarily consecutive. In FIG. 3, expansion entry 154A is identified by expansion address-A while expansion entry 154B is identified by expansion address-N. Address-A and address-N are random access address values and are not necessarily consecutive address values.

In FIG. 3, hash value 146 corresponds to Look-up Address-1 of entry 152A of look-up table 150. Entry 152A is thus identified. Then, the initial MAC address 140 is compared against the MAC addresses in entry 152A. If a match is found, the corresponding Port ID is retrieved and used as the forwarding port information. If a match is not found, then expansion pointer in expansion pointer field 156A is retrieved to index the expansion table. In the present illustration, expansion pointer field 156A contains the address value for expansion table entry 154A. Thus, the MAC addresses associated with expansion table entry 154A are compared against the initial MAC address 140 to determine if a match can be found. If a match is still not found, the expansion pointer in expansion pointer field 156C of entry 154A is retrieved to obtain the next expansion table entry for the initial MAC address 140. In the present illustration, expansion pointer field 156C contains the address value for expansion table entry 154B. Thus, the MAC addresses associated with entry 154B are compared against the initial MAC address 140 to determine if a match can be found. Subsequent expansion table entries are thus accessed until the end of the table entry expansion is reached. In the present illustration, the termination of the table entry expansion is indicated by an expansion pointer field having an address value equal to Look-up Address-1.

FIG. 3 illustrates one application of the table expansion method of the present invention where the look-up table is used to store forwarding address information for a data network. The application described in FIG. 3 is illustrative only and is not intended to limit the application of the table expansion method of the present invention to look-up tables used as address forwarding engines only. The table expansion method of the present invention can in fact be applied to any look-up tables for providing additional memory allocations for some hash values. For example, a look-up table may contain information describing the filtering parameter at the source terminals or information limiting the destination ports for a given source address.

The look-up table expansion method of the present invention provides many advantages. First, by using a random access table as an expansion area and using expansion pointers to access the random access table, the method avoids a fixed relationship between hash values and number of key-data value pairs per hash value which is the case in conventional hash table implementations. Second, by providing flexible expansion of the look-up entries, the look-up table expansion method can be readily adapted to a wide range of applications where resources can be adequately allocated to the fixed initial hash table and the expansion table. Third, the look-up table expansion method of the present invention can be used in a variety of applications including networking and caching.

The above detailed descriptions are provided to illustrate specific embodiments of the present invention and are not intended to be limiting. Numerous modifications and variations within the scope of the present invention are possible. For example, the look-up table expansion method of the present invention can be configured to operate in applications where parallel hash engines are used to perform multiple look-ups at the same time. In this case, each hash engine can apply the look-up table expansion method of the present invention or a subset of the hash engines can apply the method of the present invention. Also, the expansion pointer validity check step in the table expansion method of FIG. 1 is optional. The present invention is defined by the appended claims.

I claim:

1. A method in a look-up table for obtaining a data value associated with a key, the method comprising:

providing a first table in the look-up table, each table entry in the first table being associated with a look-up address and including one or more key-data value pairs and an expansion pointer field;

providing a second table in the look-up table, each table entry in the second table being associated with an expansion address and including one or more key-data value pairs;

receiving an input key;

applying a hash function to the input key;

generating a hash value for use as a look-up address;

indexing the first table in the look-up table using the look-up address;

identifying a first table entry in the first table associated with the look-up address;

determining if the input key matches any key in the one or more key-data value pairs in the first table entry;

if a match is found, retrieving the data value associated with the input key;

if a match is not found, retrieving a first expansion pointer in the expansion pointer field associated with the first table entry;

indexing the second table in the look-up table using the first expansion pointer;

identifying a second table entry in the second table associated with the first expansion pointer; and determining if the input key matches any key in the one or more key-data pairs in the second table entry.

2. The method of claim 1, wherein providing a second table in the look-up table further comprises providing in each table entry in the second table an expansion pointer field.

3. The method of claim 2, further comprising:

if a match is found in the second table entry, retrieving the data value associated with the input key;

if a match is not found in the second table entry, retrieving a second expansion pointer in the expansion pointer field associated with the second table entry;

indexing the second table in the look-up table using the second expansion pointer;

identifying a third table entry in the second table associated with the second expansion pointer; and determining if the input key matches any key in the one or more key-data pairs in the third table entry.

4. The method of claim 1, wherein retrieving a first expansion pointer in the expansion pointer field associated with the first table entry comprises:

determining if the first expansion pointer has the same value as the look-up address associated with the first table entry;

if the first expansion pointer has the same value as the look-up address, terminating the table look-up method; and if the first expansion pointer does not have the same value as the look-up address, continuing the table look-up method by indexing the second table in the look-up table using the first expansion pointer.

5. The method of claim 3, wherein retrieving a second expansion pointer in the expansion pointer field associated with the second table entry comprises:

determining if the second expansion pointer has the same value as the look-up address associated with the first table entry;

if the second expansion pointer has the same value as the look-up address, terminating the table look-up method; and if the second expansion pointer does not have the same value as the look-up address, continuing the table look-up method by indexing the second table in the look-up table using the second expansion pointer.

6. The method of claim 1, wherein providing a second table in the look-up table comprises providing a random access table, each table entry in the second table being random access table entry.

7. The method of claim 1, wherein after retrieving a first expansion pointer in the expansion pointer field associated with the first table entry, the method further comprises:

determining if the first expansion pointer has a valid value;

if the first expansion pointer is invalid, terminating the table look-up method; and if the first expansion pointer is valid, continuing the table look-up method by indexing the second table in the look-up table using the first expansion pointer.

* * * * *